United States Patent [19]

Cholet et al.

[11] 4,139,835
[45] Feb. 13, 1979

[54] DEVICE FOR TRANSMITTING ACOUSTIC WAVES THROUGH A LIQUID MEDIUM

[75] Inventors: Jacques Cholet, L'Etang la Ville; Pierre Magneville, Vernouillet, both of France

[73] Assignee: Institut Francais du Petrole, France

[21] Appl. No.: 779,992

[22] Filed: Mar. 22, 1977

[30] Foreign Application Priority Data

Mar. 22, 1976 [FR] France .................................. 76 08418

[51] Int. Cl.² ............................................ H04B 13/00
[52] U.S. Cl. .................................... 340/12 R; 181/120
[58] Field of Search ................. 340/8, 12 R; 181/119, 181/120

[56] References Cited

U.S. PATENT DOCUMENTS

| | | | |
|---|---|---|---|
| 3,564,492 | 2/1971 | Magneville et al. | 340/12 R |
| 3,610,366 | 10/1971 | Goldberg | 340/12 R |
| 3,613,824 | 10/1971 | Loper | 181/120 X |
| 3,792,425 | 2/1974 | Magneville | 340/12 R |
| 3,833,087 | 9/1974 | Cholet | 181/120 |

Primary Examiner—Harold J. Tudor
Attorney, Agent, or Firm—Craig & Antonelli

[57] ABSTRACT

A device for transmitting acoustic waves through a liquid medium in which it is submerged comprising two movable assemblies including respectively members provided with first contact walls and delimiting with a sealing membrane a water tight enclosure, and members provided with second contact walls which are the armatures of an electro-magnet, the respective members being so arranged that when the first contact walls are in contact, the second contact walls are spaced apart and conversely, pressure actuated means for moving the first contact walls apart from each other and releasable locking means including an energizing coil for maintaining the armatures of the electro-magnet in spaced apart relationship.

12 Claims, 4 Drawing Figures

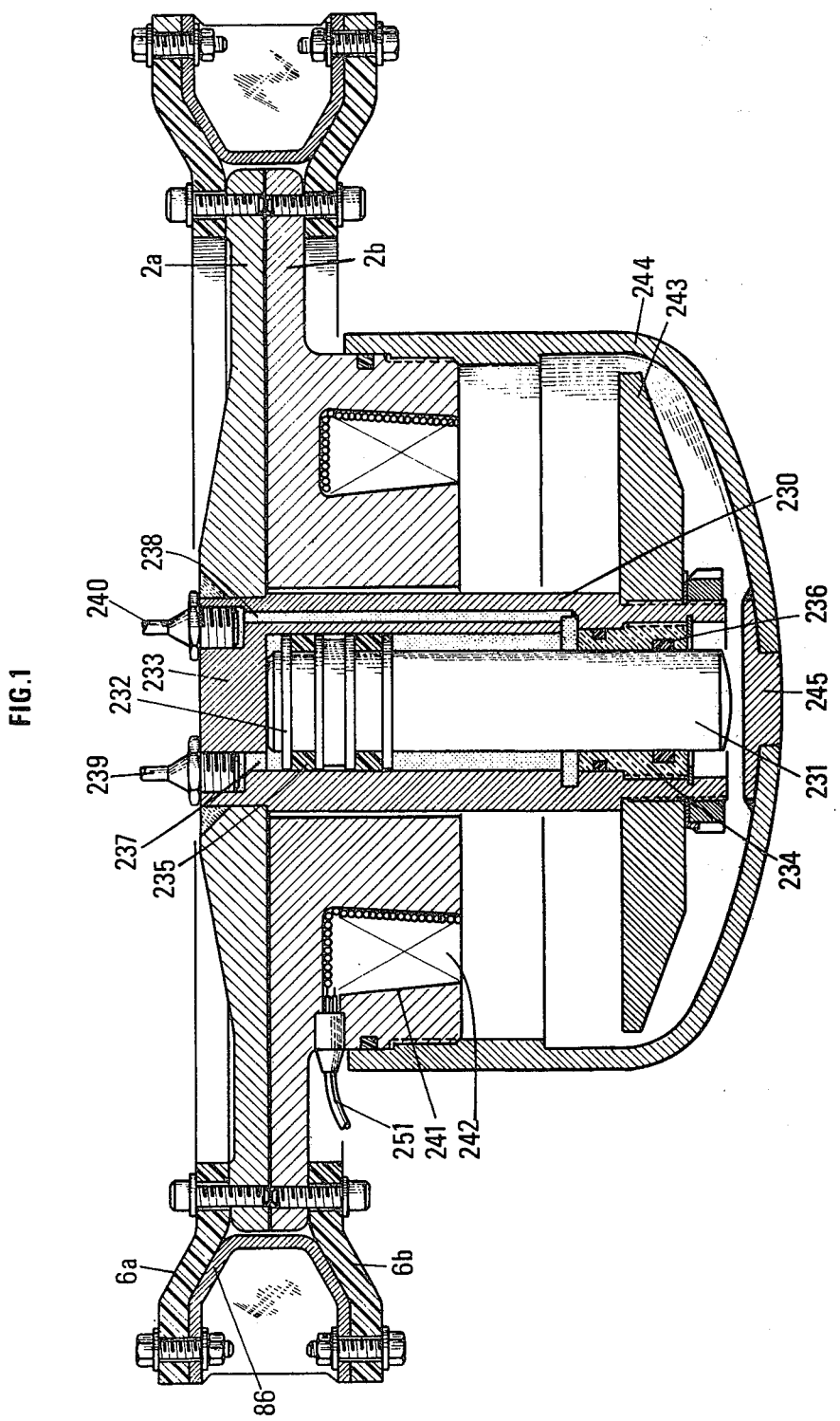

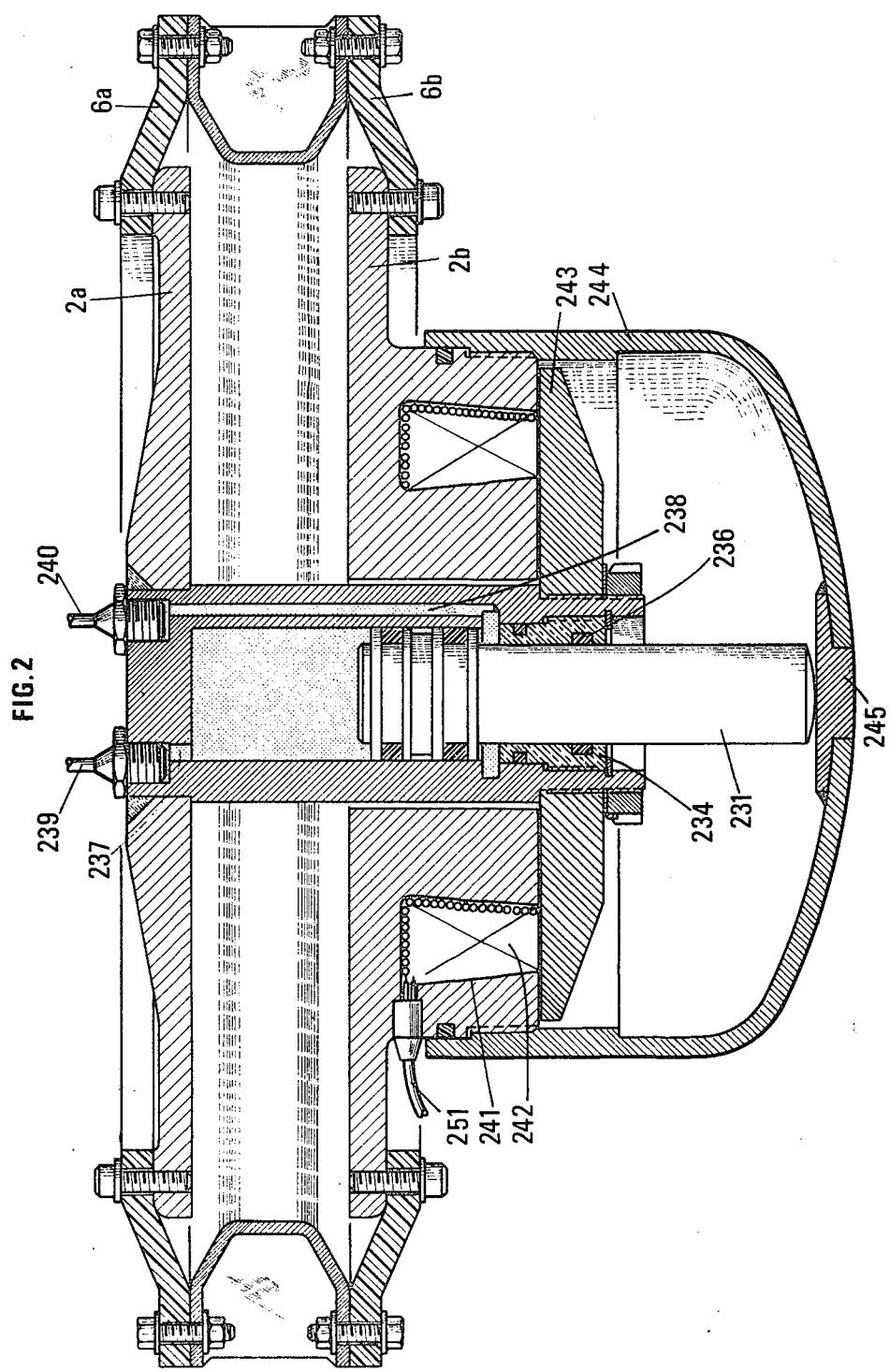

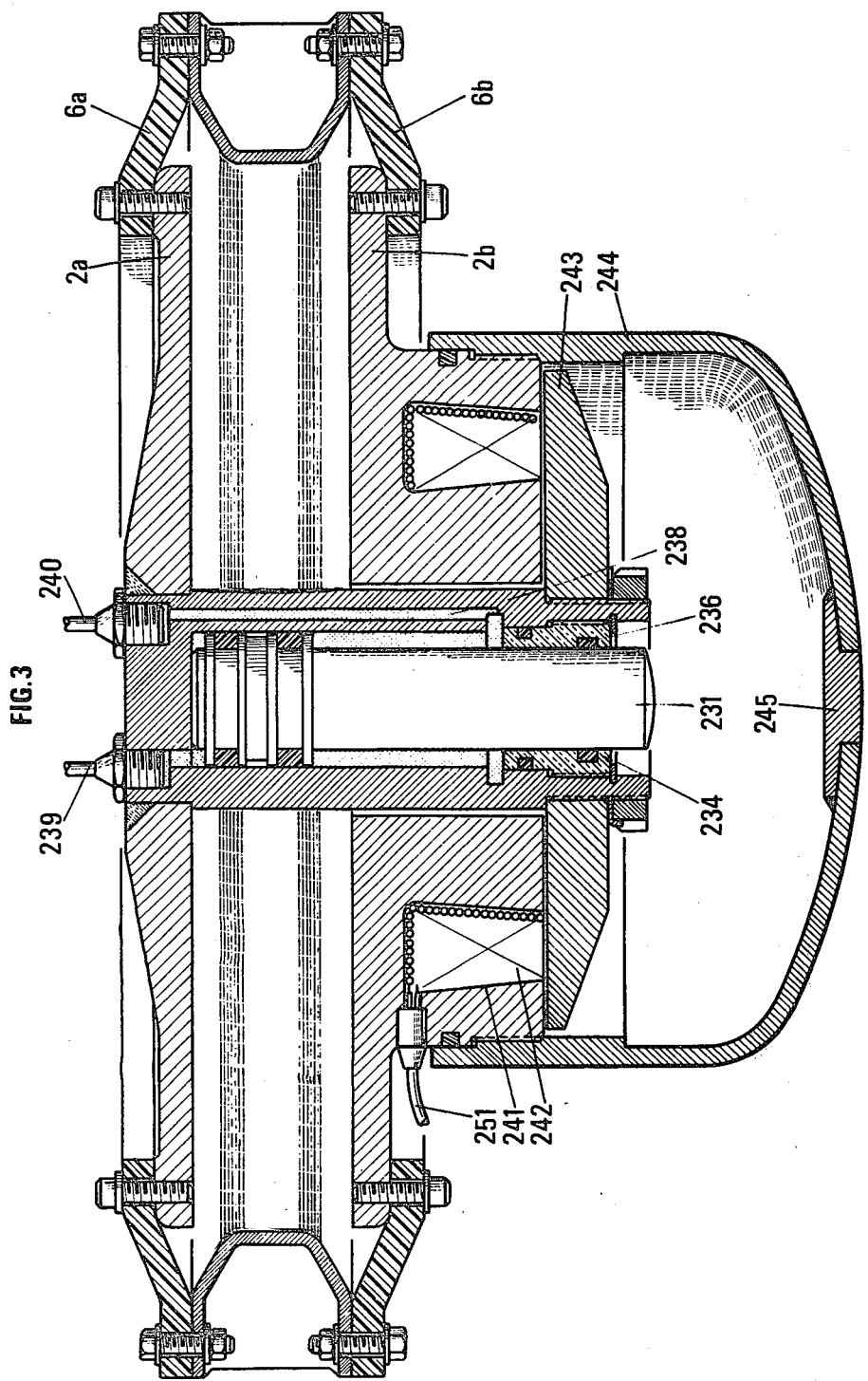

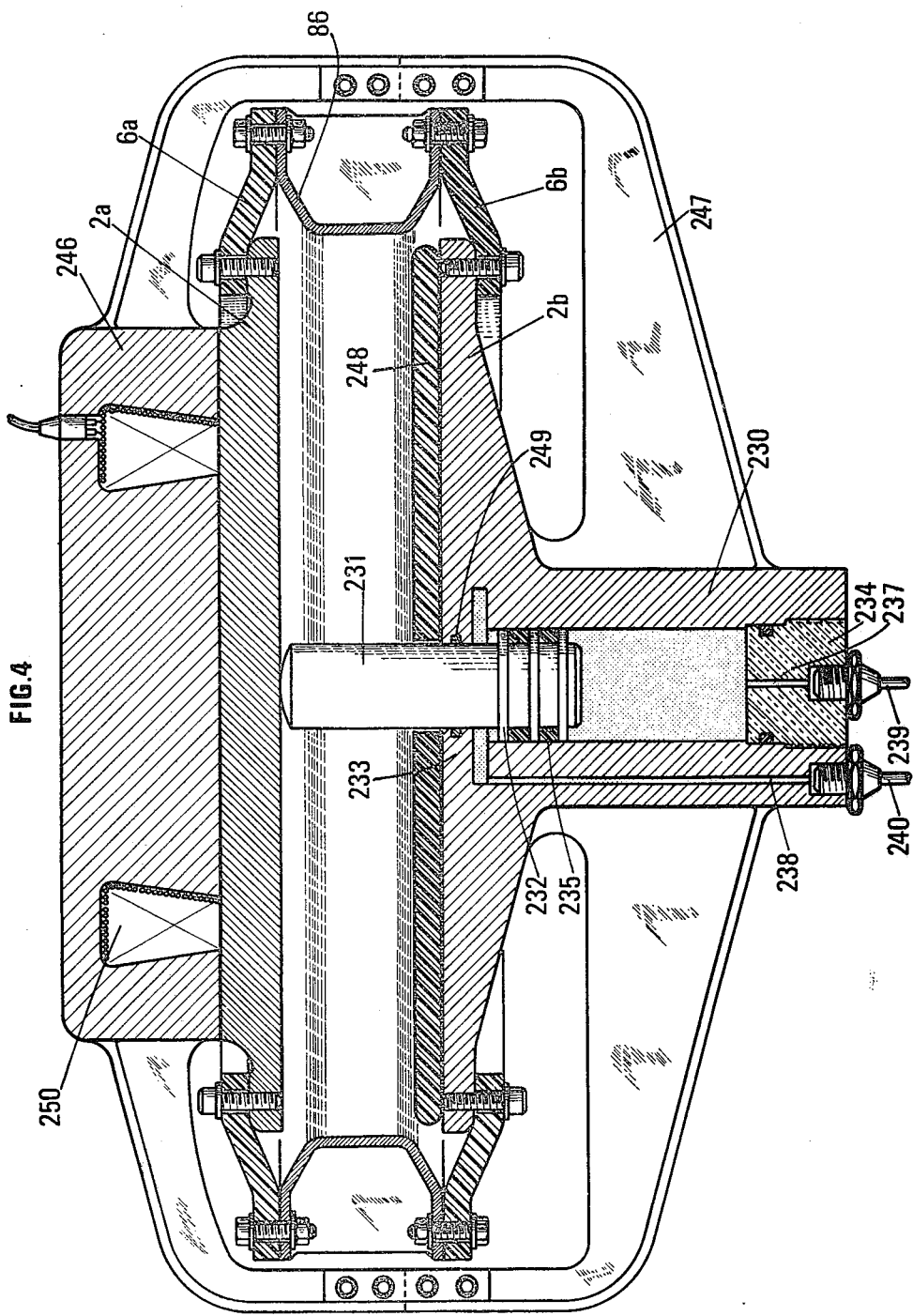

DEVICE FOR TRANSMITTING ACOUSTIC WAVES THROUGH A LIQUID MEDIUM

This invention relates to a device for transmitting acoustic waves through a liquid medium.

More particularly, it is an object of the invention to provide a device particularly adapted to marine seismic prospecting for transmitting acoustic waves by abrupt volume reduction of a submerged enclosure.

It is known to made use of a device comprising two movable members facing each other, made of a rigid material and comprising a common contact surface, directly connected to each other through an annular membrane of deformable material, defining with said movable members a water tight enclosure.

The transmission device is provided with automatic means for spacing apart said movable members, comprising for example a hydraulic system and means for intermittently locking the two members in spaced apart relation and particularly electro-magnetic locking means.

The electro-magnetic locking means comprise a contact member secured to one of the movable members, another contact member connected to the two movable members through a system of articulated arms and means for maintaining said contact members pressed intermittently against each other.

The transmission device of the invention is an improvement of the prior art device in which the system of articulated arms used for maintaining said movable members in spaced apart relation is replaced by a more resistant and more reliable arrangement.

The device of the invention comprise two assemblies adapted to be displaced with respect to each other from a first position to a second position or vice-versa, said two assemblies each comprising a member delimiting with a sealing membrane made of deformable material, a water tight enclosure. Each of the two assemblies comprises a first wall of said member delimiting the enclosure, called enclosure wall, and a second wall, called contact wall, respectively adapted to press against a first enclosure wall and a second contact wall of the other assembly.

The first enclosure walls and the second contact walls are alternately in contact in the first position and the second position. The device further comprises hydraulic means for moving the two assemblies from the first to the second position and electro-magnetic means for intermittently locking said two assemblies in one of said positions.

The device is remarkable in that the second contact walls are the walls of the two contact members respectively solid with the two assemblies and forming, with an exciting coil, said electro-magnetic locking means.

The contact members being rigidly connected to both assemblies, the electro-magnetic locking means are better adapted to resist to the quick successive movements which can be imparted to the first walls of said assemblies.

Other particular features and advantages of the invention will be made apparent from the following non limitative examples of embodiments of the invention, given with reference to the accompanying drawings wherein:

FIG. 1 is a diagrammatic cross-sectional view of a device according to a first embodiment, wherein the first walls of the assemblies are in contact.

FIG. 2 is a diagrammatic cross-sectional view of the device of FIG. 1, in which the first walls of the assemblies are brought to a position of spaced apart relation.

FIG. 3 is a diagrammatic cross-sectional view of the device of FIG. 1 in which the first walls of the assemblies are maintained in spaced apart relation by the locking means.

FIG. 4 is a diagrammatic cross-sectional view of the device according to a second embodiment of the invention, in which the first walls of the assemblies are maintained in spaced apart relation by the locking means.

According to the embodiment shown in FIGS. 1, 2 and 3, the transmission device comprises two assemblies, movable with respect to each other.

Each assembly comprises a movable member 2a, 2b, provided with a wall adapted to be pressed against a corresponding wall of the other movable member. When the device is submerged, the hydrostatic pressure applies directly onto the movable members 2a, 2b.

Two annular strips 6a, 6b, of elastic material are each secured by their internal periphery to the external periphery of one of the movable members 2a, 2b. These two strips are secured by their external periphery to an annular flange 86 which defines with the two movable members a tight enclosure.

The hydraulic means actuating the movable members are solid with one of said members 2a.

They comprise essentially a cylinder 230, a rod or push-member 231 provided towards one end thereof with a piston 232 adapted to slide through the cylinder. The piston stroke is limited, on the one hand, by the cylinder bottom 233 and on the other hand by the spacing between the contact walls of the two assemblies as hereinafter defined when the enclosure walls are in contact.

Tightening joints 235 solid in translation with piston 232, provide for the tight sliding of the latter into cylinder 230. Two channels 237, 238, opening in the cylinder on both sides of the piston are externally connected respectively to pipes 239, 240 which are connected to a hydraulic power generator, not shown.

In the embodiment of FIGS. 1 to 3, the movable member 2b is traversed by the cylinder 230.

The push-member may slide in a hole bored through member 234. Tightening joints 236 provide for a tight sliding of the push-member through the hole. The electro-magnetic means comprise an electro-magnet having one of its armatures formed by one movable member 2b of greater thickness than the other movable member.

In the thick wall of the movable member 2b, and on the side opposite to the internal face of contact with member 2a, there is provided an annular recess 241 housing a coil 242 fed with electric current from a generator, not shown. The external face of the movable member 2b forms a second wall of one of said assemblies, called contact wall. The movable member 2b may be made of a single piece or may be formed of two rigidly connected members, one of which contains the coil 242.

A plate 243, acting as second armature, is arranged in front of the first armature and secured to the wall of cylinder 230. It forms the second wall of the other assembly. The plate, as well as the first armature is made of a material having a good magnetic permeability. The distance between the plate 243 and the wall of the movable member 2b in which is provided the annular housing 241 is selected equal to the distance between the two movable members 2a, 2b in a position of maximum spaced apart relation and at most equal to the stroke of piston 232 into cylinder 230. The push-member 231 also passes through the plate 243.

A casing 244, secured to the movable member 2b, delimitates a confined volume surrounding a portion of the armature 2b and the part of cylinder 230 to which is secured the armature 243, this casing comprising a member 245 acting as stop member for the push-member 231.

The operation of the device is as follows: the two movable members being in their nearest position (FIG. 1), piston 232 is close to that end wall of cylinder 230 which is the closest to the movable member 2a and the push-member 231 is in a retracted position in said cylinder. Pressurized liquid is injected through channel 237. It pushes the piston against the other end of the cylinder. The push-member 231 comes in abutment against the stop-member 245 and drives therewith the movable member 2b up to a position in which the first armature of 2b comes in contact with the second armature 243, solid with the movable member 2a through the intermediary of the cylinder. The spacing apart motion of the movable members 2a and 2b increases the volume of the tight enclosure and generates therein a negative pressure.

The coil 242 is energized so as to lock the two movable members in a spaced apart relation (FIG. 2). Pressurized fluid is then injected through channel 238 and the push-member is again retracted inside the cylinder (FIG. 3).

The device may then be triggered. The energizing of the electromagnet being discontinued, the two movable members are rushed against each other by the combined effect of the hydrostatic pressure and the internal depression, thus producing an implosion generating acoustic waves.

In the second embodiment, shown in FIG. 4, the cylinder is solid with the movable member 2b and is entirely ouside the enclosure defined by the two movable members.

The push-member 231 is slidable in a hole bored through the bottom of the cylinder and may penetrate inside the enclosure defined by the two movable members. It comes in abutment against the contact wall of the movable member 2a. Tightening joints 249 provide for a tight sliding of the push-member 231 through the hole.

A plate 246, acting as a first armature of the electromagnet, is placed in front of the movable member 2a on the side opposite to its enclosure wall. The two walls of the plate 246 and of the movable member 2a facing each other constitute the second contact walls of the two movable members. The plate 246 is made, as well as the movable member 2a of a material having a good magnetic permeability. It is rigidly secured to cylinder 230 through arms or supporting members 247.

The maximum spacing between the plate 246 and the movable member 2a is selected at most equal to the stroke of piston 232 into the cylinder. The movable member 2a forms the second armature of the electromagnet. Within the thickness of the plate 246 is provided a housing for a coil 250 electrically connected to an electric generator, not shown.

In the embodiment of FIG. 4, the injection of pressurized liquid through channel 237, has the effect of moving the push-member toward the inside of the enclosure.

The push-member comes in abutment against the first wall of the movable member 2a and drives it in the direction of the plate 246.

The energizing of coil 250 holds the movable member 2a against the plate 246 in a position of spaced relation with respect to the other movable member. The device is then ready to be triggered.

In order to avoid a too abrupt impact of the two movable members at the end of their stroke toward each other, a disk 248, made of a damping material, may be advantageously interposed betweeen the contact surfaces.

What we claim is:

1. In a device for emitting by implosion acoustic waves in a liquid medium comprising at least first and second rigid elements in contact with the liquid medium, said rigid elements defining a water tight enclosure with a sealing membrane of deformable material, each of said elements including a contact area in said enclosure adapted to be applied intermittently against a corresponding contact area of the opposite element, hydraulic means for moving said elements apart from each other, and electro-magnetic means for intermittent locking of said elements in spaced apart relationship, the improvement comprising said first and second rigid elements including contact members separate from said contact areas, said contact members having contact surfaces which abut when said contact areas of said elements are spaced apart, and said electromagnetic means being formed with said contact members of said first and second elements, wherein said electromagnetic means comprises a first plate secured to said first element outside said enclosure through a rigid member passing through said second element, said first plate forming said contact member of said first element, and said electromagnetic means including an exciting coil secured to a second plate connected with said second element outside said enclosure, said second plate forming said contact member of said second element.

2. A device according to claim 1, wherein said first plate is adapted to be displaced with respect to said second element within a second enclosure delimited by a wall secured to said second element.

3. A device according to claim 2, wherein said rigid member comprises a cylinder secured to said first element and supporting said first plate, and wherein said hydraulic means comprises a piston slidable in said cylinder and provided with a rod adapted to intermittently abut against a stop member secured to said second element, and pressure means for displacing said piston within said cylinder.

4. A device according to claim 3, wherein said stop member is part of a cover secured to said second element and defining with the latter said second enclosure, said cover enclosing said contact members, and at least partly said cylinder and rod.

5. A device according to claim 2, wherein said rigid member comprises a cylinder supporting said first plate, said cylinder having one end portion secured to said first element, and wherein said hydraulic means comprises a piston slidable in said cylinder and provided with a rod passing through an end wall portion of said cylinder which is opposite said one end portion thereof, and said rod being adapted to intermittently abut against a wall of said second enclosure.

6. A device according to claim 1, wherein said exciting coil is housed in a recess of said second plate.

7. In a device for emitting by implosion acoustic waves in a liquid medium comprising at least first and second rigid elements in contact with the liquid medium, said rigid elements being movable relative to one another, and said rigid elements defining water tight enclosure with a sealing membrane of deformable material, each of said elements including a contact area in said enclosure adapted to be applied intermittently against a corresponding contact area of the opposite element, hydraulic means for moving said elements apart from each other, and electromagnetic means for intermittent locking of said elements in spaced apart relationship, the improvement comprising said electromagnetic means including a first plate secured to said first element outside said enclosure through a rigid member passing through said second element, and said first plate being provided with a contact wall, and said electromagnetic means including an exciting coil secured to a second plate connected with said second element outside the enclosure, and said second plate also being provided with a contact wall, said contact walls being adapted to be in contact when the contact areas of the movable elements are spaced apart.

8. A device according to claim 7, wherein said first plate is adapted to be displaced with respect to said second element within a second enclosure delimited by a wall secured to said second element.

9. A device according to claim 8, wherein said rigid member comprises a cylinder secured to said first element and supporting said first plate, and wherein said hydraulic means comprises a piston slidable in said cylinder and provided with a rod adapted to intermittently abut against a stop member secured to said second element, and pressure means for displacing said piston within said cylinder.

10. A device according to claim 9, wherein said stop member is part of a cover secured to said second element and defining with the latter said second enclosure, said cover enclosing said contact walls, and at least partly said cylinder and rod.

11. A device according to claim 8, wherein said rigid member comprises a cylinder supporting said first plate, said cylinder having one end portion secured to said first element, and wherein said hydraulic means comprises a piston slidable in said cylinder and provided with a rod passing through an end wall portion of said cylinder which is opposite said one end portion thereof, and said rod being adapted to intermittently abut against a wall of said second enclosure.

12. A device according to claim 7, wherein said exciting coil is housed in a recess of said second plate.

* * * * *